Nov. 24, 1925.
N. L. COLLINS
1,562,940
PRODUCTION OF SILICIC ACID
Filed March 27, 1924
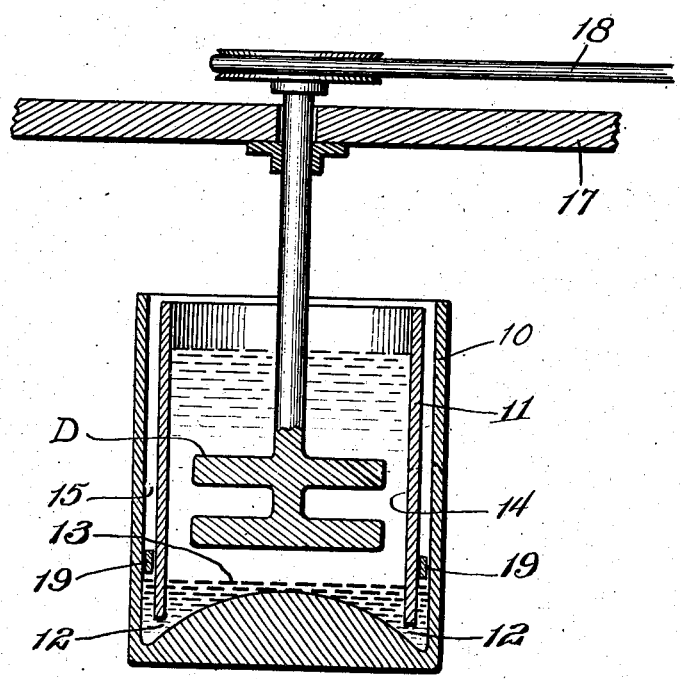
Inventor
Newell L. Collins
Watson E. Coleman
Atty Patented Nov. 24, 1925.

1,562,940

UNITED STATES PATENT OFFICE.

NEWELL L. COLLINS, OF CLARINDA, IOWA.

PRODUCTION OF SILICIC ACID.

Application filed March 27, 1924. Serial No. 702,364.

*To all whom it may concern:*

Be it known that I, NEWELL L. COLLINS, a citizen of the United States, residing at Clarinda, in the county of Page and State of Iowa, have invented certain new and useful Improvements in the Production of Silicic Acid, of which the following is a specification, reference being had to the accompanying drawings.

This invention relates to the production of silicic acid and has for an important object thereof the production of pure silicic acid by a relatively cheaper and rapid process.

A further object of my invention is to provide pure silicic acid to be as a hydrosol or hydrogel as desired. As a hydrosol it may be set to a gel in the presence of well-known substances.

Heretofore it has only been possible to produce pure silicic acid as a hydrosol by a long and impractical process in which the impurities are dialized from the silicic acid. Silica gel has been produced on a large scale and this when dialized results in purified silicic acid. This last method, however, is disadvantageous in that the hydrosol form cannot be secured and a further disadvantage in that the silicic acid thus secured contains impurities notably sodium. Impurities present in silicic acid, as in the present manufacture, render the same unfit for the particular use for which it is the purpose of this invention to provide silicic acid, namely, for use in a semi-dry storage battery, the presence of sodium having to date rendered the use of silicic acid in such batteries with any degree of efficiency impossible.

In accordance with my process I employ a good grade of water glass having a specific gravity of about 1.37 which I dilute with three parts of distilled water. This solution is then subjected to electrolysis between a rapidly rotating non-corrosive anode and a mercury cathode. The use of lead in the construction of the anode has been found advantageous. Current of about four or five amperes per square decimeter of anode surface has been found most efficient although this amount can be varied without materially altering the results obtained. A good grade of water glass consists of a solution of sodium silicate and sodium hydroxide. The sodium will be deposited in the mercury cathode with a current efficiency and it has been found that by employing this process the sodium will be deposited in the mercury with a current efficiency of nearly 100%. Oxygen from the water is deposited at the rotating anode and the hydrogen of the water takes the place of the sodium of the water glass forming silicic acid. The reaction may be represented approximately as follows:—

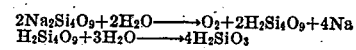
$$H_2Si_4O_9 + 3H_2O \longrightarrow 4H_2SiO_3$$

In the accompanying drawings I have illustrated a simple apparatus which may be efficiently employed in carrying out my process. This apparatus consists of an outer container 10 within which is disposed an open bottom cylinder 11 of less external diameter than the internal diameter of the casing 10, the bottom of the cylinder being in slightly spaced relation to the bottom of the outer casing 10 to thereby provide a passageway 12. In the bottom of the container 10 the mercury cathode 13 is disposed, the mercury being of a depth at least covering the upper end of the passageway 12 and sealing communication between the main compartment 14, represented by the space within the cylinder 11 and above the bottom of the casing 10, and the auxiliary compartment 15, represented by the space between the outer wall of the sleeve and the inner wall of the casing. The mercury, of course, extends into the compartment 15 to the same level as it is in the compartment 14. Suspended in the compartment 14 is a lead anode supported above the casing 10, as at 17, for rotation and driven as by a belt 18 from a suitable source of power. The water glass solution is placed in the compartment 14 upon the upper surface of the mercury.

In the operation of the apparatus, as above described, the rotation of the anode D causes the mercury to circulate so that sodium mercury alloy formed by the combination of the sodium in the water glass and the mercury is passed through the space 12 into the outer compartment 15. In this outer compartment the sodium is constantly removed from the mercury either by placing in the compartment 15 above the mercury a sulphuric acid solution or by employing a sodium hydroxide solution in which a cathode 19 is immersed. When the sulphuric acid solution is employed sodium sulphate is formed and when the sodium hydroxide solution with the cathode 19 is employed sodium hydroxide is formed. Either of these by-products would be valuable and at the same time the system of removing from the mercury the sodium combining therewith permits the use of a relatively small amount of mercury and its use simply as a transportation element for the sodium from the water glass solution to the point of withdrawal.

Figuring the amount of sodium in the water glass as 8% and knowing the current, it is possible to calculate the end of the run very closely from the following formula:

$$\text{Time} = \frac{\text{equivalents of sodium} \times 96500}{3600 \times \text{amperes}}$$

It has been found that by the use of the process above set forth it is possible to secure, to all practical purposes, a 100% removal of sodium from the water glass. The silicic acid solution sets to a gel a few hours after the last traces of the sodium have been removed. If it is desired to retard the setting of the gel for a considerable length of time, the process can be interrupted before the sodium is completely removed. A very small percentage of sodium does not harm the silicic acid for most purposes, it merely acts as a peptization agent retarding the setting of the silicic acid to a gel for several days. It has further been found that by the use of an apparatus employing the rotating anode, as above described, the silica deposit upon the anode can be prevented, particularly when the water glass is properly diluted. It is pointed out that if this silic deposit upon the anode is not prevented not only would the aqueous solution become so diluted in strength as to become useless, but the silica would in time serve as an insulation for the anode preventing passage of current through the solution. Silicic acid produced by this process has been found to be entirely satisfactory for use in the semi-dry storage battery construction above referred to and it will be obvious that the process employed may be very cheaply and readily carried out. Particular attention is directed to the fact that by this process substantially pure silicic acid in either hydrosol or hydrogel form can be obtained.

I claim:—

1. A process of producing pure silicic acid consisting in electrolyzing an aqueous solution of water glass between an anode and a mercury cathode and continuously agitating the anode.

2. A process of producing pure silicic acid consisting in submitting an aqueous solution of water glass to electrolysis between a mercury cathode and a rotating anode.

3. Apparatus for producing pure silicic acid comprising an electrolyte jar having an anode and a mercury cathode and means for rotating the anode.

4. Apparatus for producing pure silicic acid comprising an electrolyte jar having two compartments, an anode disposed in each compartment, a mercury cathode common to both compartments and sealing communication between the compartments, and means for rotating one of said anodes.

5. Apparatus for producing pure silicic acid by electrolysis comprising an electrolyte jar having two compartments, a mercury cathode sealing communication between the compartments, an anode within one compartment, and means for rotating the anode.

In testimony whereof I hereunto affix my signature.

NEWELL L. COLLINS.